Nov. 1, 1949     G. HERZOG     2,486,946
MEASUREMENT OF PENETRATIVE RADIATION
Filed Aug. 26, 1944
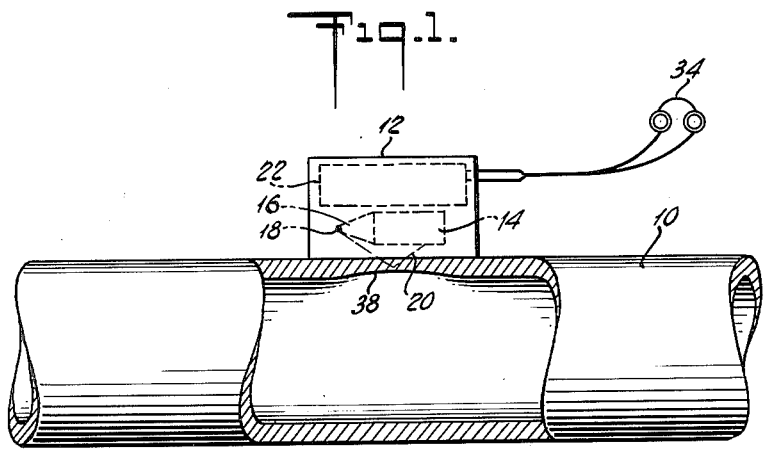
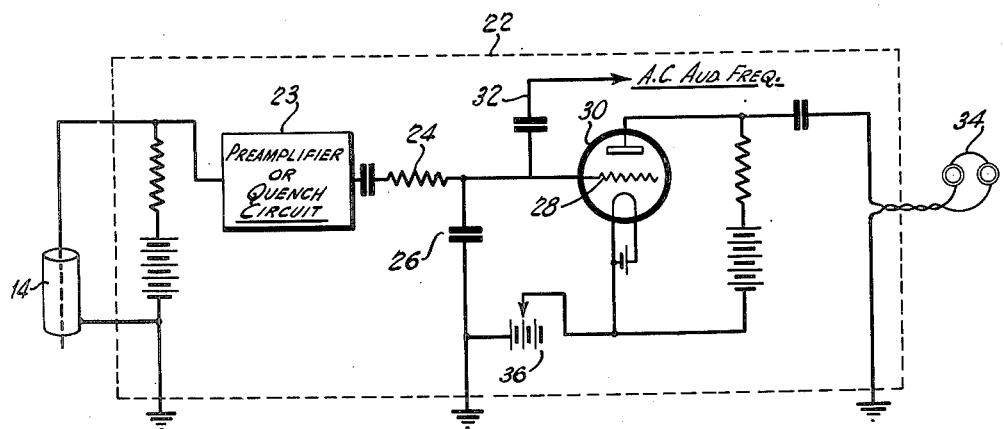
INVENTOR
GERHARD HERZOG.
BY
ATTORNEY Patented Nov. 1, 1949

2,486,946

UNITED STATES PATENT OFFICE 2,486,946

MEASUREMENT OF PENETRATIVE RADIATION

Gerhard Herzog, Houston, Tex., assignor to The Texas Company, New York, N. Y., a corporation of Delaware Application August 26, 1944, Serial No. 551,368

10 Claims. (Cl. 250—83.6)

This invention relates to the measurement of penetrative radiation and more particularly to a method and an apparatus for determining the response or counting rate of a radiation detector by transforming the detector output into an audible tone, the volume or loudness of which is proportional to the output of the detector and thus to the amount of radiation detected.

The principal object of the invention is the provision of a method and a comparatively simple apparatus by means of which variations in penetrative radiation may be noted quickly and accurately and without the necessity of visual inspection of a meter or other instrument.

In U. S. Letters Patent No. 2,277,756 granted March 31, 1942 to D. G. C. Hare, a method and an apparatus are disclosed by means of which the thickness of an object, such as a plate or the wall of a tube or pipe, can be determined from one side without the necessity of access to the other side. In accordance with the Hare patent, penetrative radiation, such as gamma rays, from a radiation source placed near one side of the object to be measured penetrates the object wherein a portion of the radiation is diffused and scattered back to a radiation detector disposed near and shielded from the source and at the same side of the object at the source. In accordance with the disclosure in the patent the output of the detector, which may be a device of the Geiger-Mueller counter type, is amplified and connected to a meter such as a galvanometer, the reading of which is indicative of the response of the detector and thus the thickness of the object. In a Geiger-Mueller counter, the output is in the form of electrical pulses the number of which is in direct proportion to the radiation being measured, and it is usually necessary, by the use of suitable circuits, to count these pulses or to transform them into a voltage the size of which can be measured by a suitable instrument. In a device such as is disclosed in the Hare patent, it is usually necessary to place that portion of the instrument containing the radiation source and detector against or near the object the thickness of which is to be measured and to allow it to remain there for a few seconds—at least until the galvanometer needle or pointer comes to rest, so that a reading may be taken. It will be seen, therefore, that it would be difficult or impractical to attempt to obtain continuous readings, as while moving the instrument along the surface of the object being measured at a substantially uniform speed.

In accordance with the present invention a method and a measuring device are provided by means of which variations in radiation intensity can be immediately and continuously detected, such as those which occur when a radiation source and detector are passed continuously along an object which is irregular in thickness. In carrying out the invention, the pulses of the detector are transformed into a D. C. voltage, the size of which varies with the radiation intensity and this D. C. voltage and an alternating current, the frequency of which is within the audible range, are impressed upon the grid of an amplifier tube. A sound producing device, such as a loud speaker or a pair of earphones, is connected in the plate circuit of the tube and will produce a tone the loudness of which will vary proportionately to the D. C. voltage, and thus to the intensity of the radiation being measured. As stated above, one application of the invention is in the measurement of thickness. Because of the almost instantaneous change in the loudness of the tone when there is a variation in the amount of radiation detected, an operator wearing a pair of earphones can move the instrument continuously along the surface of the object to be measured and if there are non-uniformities in the thickness these will be indicated to the operator immediately as they occur. If the thickness varies more than a predetermined amount, the operator, of course, can then examine carefully the portion which is too thick or too thin with an instrument such as is shown in the previously mentioned Patent No. 2,277,756 and a reading may be had of the exact thickness of the questionable portion.

In addition to the measurement of thickness there are, of course, many other applications of the invention. In the application of Alexander Wolf, Serial No. 551,369, now Patent No. 2,456,233, filed concurrently herewith, a disclosure is made of a method and an apparatus for determining liquid level by detecting from the outside of an opaque vessel the position, i. e., the height of a member containing a small amount of radioactive substance and floating on liquid in the vessel. With the present invention an operator wearing the earphones need merely push the instrument vertically along the outer surface of the vessel until the tone in the earphones is at its greatest intensity. This will be an indication that the instrument is horizontally opposite the float containing the radioactive material and, if desired, a record may then be made of the height of the liquid level.

For a better understanding of the invention, reference may be had to the accompanying drawing in which:

Figure 1 is a somewhat diagrammatic illustration of the instrument applied to the measuring of the thickness of the wall of a pipe or tube; and Figure 2 is a diagram showing the essential parts of the electrical circuit.

Referring to the drawing, let it be assumed that it is desired to measure the thickness of the wall of a pipe, a section of which is shown at 10. An instrument indicated generally by the housing 12 contains a radiation detector 14, shown as of the Geiger-Mueller counter type, and this detector has affixed to one end a radiation shield, illustrated as a solid cone 16, of a material such as lead capable of absorbing gamma radiation. At the apex of the cone 16, a small quantity of a radioactive material such as radium 18 is affixed, the shield 16 serving to prevent radiation from the radium from passing directly to the detector 14. Gamma rays from the source 18 penetrate the wall of the pipe 10 wherein scattering takes place, some of the scattered radiation passing back outwardly of the pipe, as is indicated by the dotted line 20, so that it will strike the detector 14 wherein electrical pulses are produced, the number of these pulses depending upon the amount of back-scattered radiation which in turn is, of course, dependent upon the thickness of the wall of the pipe. The output of the detector 14 is connected to a circuit shown diagrammatically at 22 in Figure 1 and more completely in Figure 2.

With reference to Figure 2, the output of the detector 14 is passed preferably through a pre-amplifier or a suitable quench circuit shown diagrammatically at 23 and then through an integration circuit comprising an electrical resistance 24 and a condenser 26 wherein the frequency of the pulses or discharges is transformed into a D. C. voltage the size of which is proportional to the counting rate of the detector. This D. C. voltage is applied to the grid 28 of an amplifier tube 30, and connected to this same grid is an alternating current having a frequency in the audible range, the connections for this alternating current being shown at 32. In the plate circuit of the tube 30, a pair of earphones 34 or a loud speaker is connected. A grid bias battery 36 is provided and this battery can be adjusted so that no audible tone will be emitted from the earphones 34 when the radiation striking the detector 14 is less than a predetermined amount. When the intensity of the detected radiation reaches or exceeds the predetermined amount, an audible tone will be emitted from the earphones and the volume or loudness of this tone will vary proportionately to the D. C. voltage and thus to the intensity of the radiation detected.

Referring again to Figure 1 and assuming that the instrument 12 is placed upon the pipe 10 to the right of the position shown in the drawing, the battery 36 can be adjusted, as described above, so that an audible tone will be emitted from the earphones. Assuming again that the instrument is moved toward the left, as shown in the drawing, as soon as it reaches the vicinity 38 where the thickness of the pipe wall is less than that of the portion of the pipe previously examined, the tone will decrease in loudness and this may serve as a warning of the thin spot. The exact thickness in the vicinity 38 can subsequently be accurately measured as by means of the method and apparatus disclosed in the aforementioned Hare Patent 2,277,756.

It will be seen that with the present invention, it is not necessary to wait for an appreciable time after the instrument 12 has been placed on the pipe 10 before a measurement can be made; on the contrary, the instrument can be moved along the outer surface of the pipe without stopping and any non-uniformities in pipe thickness exceeding a predetermined amount can be discerned quickly. Obviously the speed with which the thickness of objects, such as plates or pipe or tube walls, can be checked with this method is greater than it would be if it were necessary to hold the instrument stationary each time an observation is made.

The essential circuit shown in Figure 2 can be designed easily by those familiar with the electrical art so that, by the utilization of suitable transformers and the like, the electrical current necessary for energizing the circuit elements can be obtained from a small battery housed within the instrument, thus eliminating the necessity for connection to an outside source of power. The entire instrument 22, therefore, can be self-contained and sufficiently light in weight so that it can be moved readily along an object to be measured. As has been stated hereinbefore, the instrument can be utilized for determining liquid level by mounting it on an extensible pole or rod so that it can be moved vertically along the wall of a vessel parallel to the path of an element containing radioactive material and floating upon liquid within the vessel. An operator wearing the earphones 34 can readily determine when the instrument is horizontally opposite the float, and thus the level of the liquid, by the loudness of the tone which he hears.

Although a radiation detector of the Geiger-Mueller type has been described, it is to be understood that the principles involved in the invention are also applicable for use with other forms of radiation detectors such, for instance, as proportional counters and ionization chambers.

Obviously many modifications and variations of the invention, as hereinbefore set forth, may be made without departing from the spirit and scope thereof, and therefore only such limitations should be imposed as are indicated in the appended claims.

I claim:

1. The method of measuring intensity of gamma radiation which comprises exposing a gamma ray detector of the counter type to a source of said radiation, converting the output of said detector to an audible tone the intensity of which varies proportionately with the intensity of said output, and determining the amount of said radiation from the volume of said tone.

2. The method of determining the counting rate of a detector of penetrative radiation which comprises converting the output of the detector to a D. C. voltage the size of which is proportional to said counting rate, impressing said D. C. voltage on the grid of an amplifier tube, simultaneously impressing on said grid an A. C. voltage having a frequency within the audible range, converting the output of said tube into sound, and determining from the volume of said sound the counting rate of said detector.

3. The method of measuring the thickness of a wall from one side thereof which comprises passing gamma radiation into said wall, detecting a portion of said radiation which is scattered in the material of said wall and returned outwardly thereof by a device of the pulse producing type, converting the pulses produced by said device into an audible tone, and determining the thickness of said wall from the loudness of said tone.

4. The method of measuring the thickness of a wall from one side thereof which comprises passing gamma radiation into said wall from one side, detecting a portion of said radiation which is scattered in the material of said wall and returned outwardly of said side by a device of the pulse producing type, converting the pulses produced by said device into an audible tone the volume of which varies with the intensity of the detected radiation and thus with the thickness of said wall, and determining the wall thickness from the volume of said tone.

5. The method of measuring the thickness of a wall from one side thereof which comprises passing penetrative radiation into said wall from one side, detecting a portion of said radiation which is scattered in the material of said wall and returned outwardly of said side by a device of the pulse producing type, converting the pulses produced by said device into a D. C. voltage the size of which is proportional to the intensity of the detected, scattered radiation, impressing said D. C. voltage on the grid of an amplifier tube, impressing on said grid an A. C. voltage having a frequency within the audible range, converting the output of said tube into sound, and determining the thickness of said wall from the volume of said sound.

6. The method of determining variations in the thickness of a wall from one side thereof which comprises passing penetrative radiation from a source into said wall from one side, detecting a portion of said radiation which is scattered in the material of said wall and returned outwardly of said side by a device of the pulse producing type, converting the pulses produced by said device into a D. C. voltage the size of which is proportional to the intensity of the detected, scattered radiation, impressing said D. C. voltage on the grid of an amplifier tube, impressing on said grid an A. C. voltage having a frequency within the audible range, converting the output of said tube into sound, and moving said source and the radiation detecting means along said wall, variations in volume of said sound indicating proportionate variations in the thickness of said wall.

7. A device for measuring penetrative radiation such as gamma rays or the like comprising means for converting said radiation into electrical pulses the number of which varies proportionately with the intensity of said radiation, means for converting said pulses into a D. C. voltage the size of which varies with said intensity, a source of alternating current having a frequency within the audible range, an amplifier tube having grid and plate circuits, means for impressing said D. C. voltage and said alternating current on the grid of said tube and means in said plate circuit for converting variations in the plate voltage into sound.

8. A device for measuring penetrative radiation such as gamma rays or the like comprising a radiation detector of the pulse producing type, means for converting the output of said detector to a D. C. voltage the size of which varies with the intensity of the radiation, a source of alternating current having a frequency within the audible range, an amplifier tube having a grid and plate circuit, means for impressing said D. C. voltage and said alternating current on the grid of said tube and means in said plate circuit for converting variations in the plate voltage into sound, the volume of which varies proportionately to said D. C. voltage.

9. A device for determining the counting rate of a detector of penetrative radiation such as gamma rays or the like comprising means for converting the detector output into a D. C. voltage varying in size in proportion to said counting rate, a source of alternating current having a frequency within the audible range, an amplifier tube having grid and plate circuits, means for impressing said D. C. voltage and said alternating current on the grid circuit of said tube and means in said plate circuit for producing an audible tone the volume of which varies proportionately to said D. C. voltage.

10. A device for measuring the thickness of a wall from one side thereof comprising a source of penetrative radiation disposed near said wall side, a radiation detector of the pulse producing type disposed near said source and at the same side of said wall, means for converting the output of said detector to a D. C. voltage, a source of alternating current having a frequency within the audible range, an amplifier tube having grid and plate circuits, means for impressing said D. C. voltage and said alternating current on said grid circuit, and means for converting variations in plate voltage into a sound varying in volume with said D. C. voltage and thus with said detector output.

GERHARD HERZOG.

REFERENCES CITED

The following references are of record in the file of this patent:

UNITED STATES PATENTS

| Number | Name | Date |
| --- | --- | --- |
| 1,542,937 | Hammond | June 23, 1925 |
| 1,954,204 | Hayes | Apr. 10, 1934 |
| 2,124,600 | Worrall | July 26, 1938 |
| 2,277,756 | Hare | Mar. 31, 1942 |
| 2,361,274 | Cravath et al. | Oct. 24, 1944 |
| 2,391,093 | Howell | Dec. 18, 1945 |
| 2,391,532 | Wilmotte | Dec. 25, 1945 |
| 2,434,297 | Test et al. | Jan. 13, 1948 |

FOREIGN PATENTS

| Number | Country | Date |
| --- | --- | --- |
| 728,032 | France | Apr. 5, 1932 |